United States Patent
Herman et al.

(10) Patent No.: US 7,037,423 B2
(45) Date of Patent: May 2, 2006

(54) METHOD FOR REMOVAL AND DETOXICATION OF DISSOLVED METALS IN A RAINWATER DISCHARGE

(75) Inventors: Stewart T. Herman, Hellertown, PA (US); Joseph Bartosh, Pen Argle, PA (US); Zachary J. Lezoche, Bethlehem, PA (US); Richard T. Sewald, Sr., Bethlehem, PA (US)

(73) Assignee: ISG Technologies Inc., Richfied, OH (US)

( * ) Notice: Subject to any disclaimer, the term of this patent is extended or adjusted under 35 U.S.C. 154(b) by 0 days.

(21) Appl. No.: 10/219,723

(22) Filed: Aug. 15, 2002

(65) Prior Publication Data

US 2004/0031753 A1    Feb. 19, 2004

(51) Int. Cl.
   *C02F 3/00*   (2006.01)

(52) U.S. Cl. .............. 210/151; 210/170; 210/290; 405/129.25; 405/129.65; 405/129.7

(58) Field of Classification Search ........... 210/150, 210/151, 170, 290; 405/129.2, 129.25, 129.65, 405/129.7
   See application file for complete search history.

(56) References Cited

U.S. PATENT DOCUMENTS

| | | | |
|---|---|---|---|
| 615,941 A | 12/1898 | Wuichet | |
| 2,609,099 A | 9/1952 | Griswold | |
| 2,742,156 A | 4/1956 | Spangler | |
| 3,204,770 A | 9/1965 | Brink | |
| 3,797,378 A | 3/1974 | Morris | |
| 4,624,604 A * | 11/1986 | Wagner et al. | 405/129.7 |
| 4,990,031 A * | 2/1991 | Blowes et al. | 210/170 |
| 5,223,154 A | 6/1993 | MacPherson, Jr. et al. | |
| 5,318,699 A * | 6/1994 | Robertson et al. | 210/151 |
| 5,322,629 A | 6/1994 | Stewart | |
| 5,413,936 A | 5/1995 | Rupert | |
| 5,770,090 A | 6/1998 | Lewis | |
| 6,100,081 A * | 8/2000 | Buelna | 210/150 |
| 6,123,840 A * | 9/2000 | Suzuki et al. | 210/151 |
| 6,153,098 A | 11/2000 | Bayerlein et al. | |
| 6,171,853 B1 | 1/2001 | Kim | |
| 6,200,469 B1 * | 3/2001 | Wallace | 210/150 |
| 6,248,233 B1 | 6/2001 | Priggemeyer et al. | |
| 6,331,249 B1 | 12/2001 | Nelson et al. | |
| 6,337,025 B1 | 1/2002 | Clemenson | |
| 2001/0045383 A1* | 11/2001 | Coffman | 210/150 |

* cited by examiner

Primary Examiner—Christopher Upton
(74) Attorney, Agent, or Firm—Harold I. Masteller, Jr.

(57) ABSTRACT

The present invention provides a water treatment apparatus and method for reducing toxicity in zinc containing acid stormwater runoff, the apparatus comprising a first filter layer of high calcium material a last filter layer comprising a drainpipe arrangement embedded within an aggregate; and at least one intermediate filter layer comprising a wood mulch material positioned between the first filter layer and said last filter layer.

26 Claims, 5 Drawing Sheets

METHOD FOR REMOVAL AND DETOXICATION OF DISSOLVED METALS IN A RAINWATER DISCHARGE

FIELD OF THE INVENTION

The present invention is directed to the removal and/or detoxication of dissolved metals from acid stormwater runoff, and in particular it is directed to the removal of dissolved metals contained in acid stormwater discharged from zinc coated steel surfaces such as galvanized roof panels and culverts, and in particular, from Galvalume® coated steel roof panels and the like.

BACKGROUND ART

Acid rainfall is caused by the discharge of sulfur dioxide into the atmosphere by coal fired power plants, internal combustion engines, and various other industrial sources. Such acid rainfall is environmentally problematic in that it will leach metals from pervious surfaces such as lawns and cultivated fields, as well as from impervious surfaces such as metal roofing and parking lot surfaces. In certain instances, these leached, or dissolved metals, may be harmful to particular biota living in surface waters that receive acid stormwater runoff.

Performance data collected by monitoring stormwater discharged from existing zinc coated steel roofing, and data collected for the surrounding environment receiving such stormwater runoff, clearly show that acid rainfall leaches zinc from galvanized and Galvalume® coatings. In response to such findings, various state and local environmental regulatory agencies are beginning to place stringent zinc level criteria on stormwater discharged from zinc coated roof surfaces. For example, the State of Massachusetts and King County in the State of Washington are two regulatory agencies that have passed stringent codes directed to the treatment and disposal of zinc containing stormwater discharge. These new environmental regulations present problems for architects and steel producers alike, especially along the eastern half of the nation where rainfall has a typical pH level of about 4.8 or lower due to increased concentrations of sulfuric and nitric acids in the atmosphere.

One approach for dealing with the zinc-leaching problem is often referred to as "end of pipe" treatment. End of pipe treatment systems are either natural or artificial wetlands that use one or a combination of mechanisms to remove heavy metals from urban runoff (leachate) and mine drainage operations. However, although such wetland treatment systems are found useful for removing zinc ions from wastewaters and drainage streams, they are expensive because they require large land areas to be effective. Such large systems are capital intensive, and they require constant maintenance. Therefore, there is a need within the art to provide a water treatment system that is low cost, that requires minimal or no attention during operation (passive), and is capable of removing dissolved metals so that the treated stormwater runoff meets environmental regulatory standards for zinc concentration levels before it is discharged to environment.

SUMMARY OF THE INVENTION

It is therefore an object of the present invention to provide a water treatment system that discharges to environment treated stormwater runoff having a zinc concentration at or below levels permitted by environmental regulations.

It is a further object of the present invention to provide a low cost, passive water treatment system that precipitates and removes dissolved metals from stormwater runoff before the treated water is discharged to environment.

It is another object of the present invention to provide a water treatment system that increases both carbonate alkalinity (hardness) and dissolved organic carbon concentrations in stormwater to reduce the toxicity of any remaining metals before the treated water is discharged to environment.

In satisfaction of the foregoing objects and advantages, the present invention provides a water treatment system and method for reducing toxicity in zinc containing acid stormwater runoff, the apparatus of the system including a first filter layer comprising a high calcium material a last filter layer comprising a drainpipe arrangement embedded within an aggregate; and at least one intermediate filter layer comprising a wood mulch material positioned between the first filter layer and said last filter layer.

BRIEF DESCRIPTION OF THE DRAWINGS

The above and other objects, advantages and novel features of the present invention will become apparent from the following detailed description of the preferred embodiment of the invention illustrated in the accompanying drawings, wherein.

DESCRIPTION OF THE PREFERRED EMBODIMENTS OF THE INVENTION

The following detailed description of the present invention is directed to the removal of dissolved metals from acid stormwater runoff, and in particular it is directed to the removal of dissolved metals contained in acid stormwater discharged from zinc coated steel surfaces such as galvanized roof panels, culverts, and, for example, from Galvalume® coated steel roof panels and the like.

As heretofore stated above, in some areas of the world, rainfall is made acidic by sulfur dioxide that is discharged from coal-fired power plants, internal combustion engines, and various other industrial sources. Such acidic rainfall can leach metals from pervious and impervious surfaces. Newer environmental regulations are problematic for manufactures of zinc coated building materials, for example, Galvalume® coated roofing and/or siding panels. When acid rainfall contacts bare Galvalume® coated steel panels, the stormwater dissolves zinc in excess of agency stormwater runoff criteria. This places bare Galvalume® roofing and siding materials at a disadvantage when compared to other non-metallic roofing and siding systems available in the marketplace. One possible solution to the problem is painting Galvalume® panels. Acid rain runoff from painted Galvalume® surfaces will comply with environmental regulations for zinc levels. However, painting increases costs and the painting cost will continue to place Galvalume® materials at a disadvantage in the marketplace. Accordingly, there has been a need for a low cost, passive water treatment system that removes dissolved metals from acid stormwater discharged from bare (unpainted) Galvalume® coated steel panels before the stormwater is discharged to environment. It should be understood that in the present disclosure, a passive water treatment system defines a water treatment system that needs little or no worker attention during normal) operation. The present invention provides a low cost water treatment system that enables manufactures of bare Galvalume® building materials to enjoy a competitive position in the marketplace. In addition, the scope of the present water treatment system invention extends beyond the manufacturing and construction industries in that municipalities, and other entities, must also treat metal bearing acid stormwater runoff before it can be discharged into rivers and streams. As such, the simplicity and efficiency of the present invention will be of interest to such municipalities and other entities.

Figure 1:
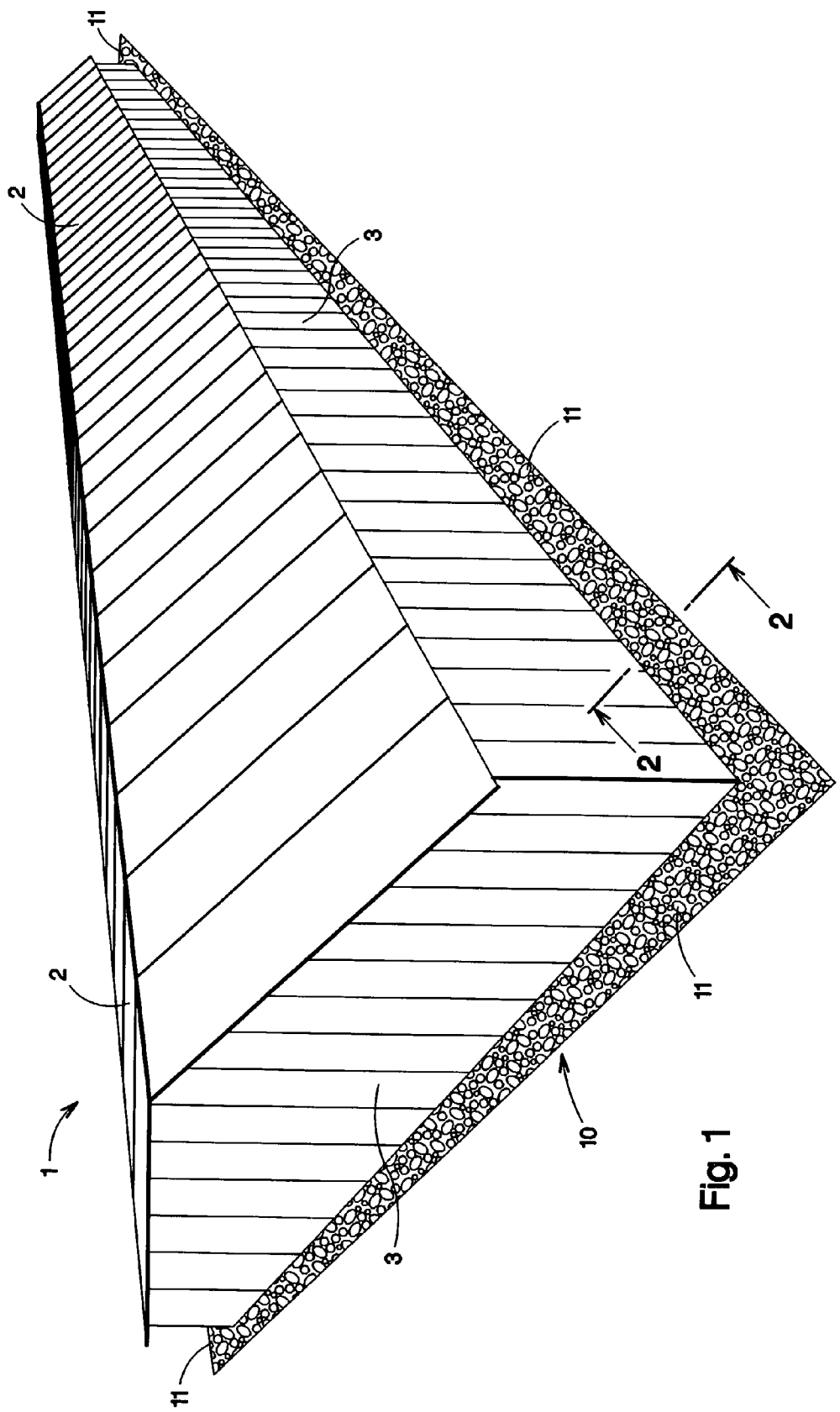
FIG. 1 is an isometric view showing an on-site installation of the present acid water treatment system invention.

Referring to FIG. 1 of the drawings, the preferred embodiment of the present water treatment system 10 is shown installed along the periphery of a typical industrial or warehouse type structure 1 that is roofed with zinc coated roofing panels 2 and/or or sided with zinc coated siding panels 3. The roofing and siding panels 2 and 3 may be coated with any suitable zinc or zinc alloy coating such as, for example, hot-dip galvanized or Galvalume® coated steel sheet panels.

Figure 2:
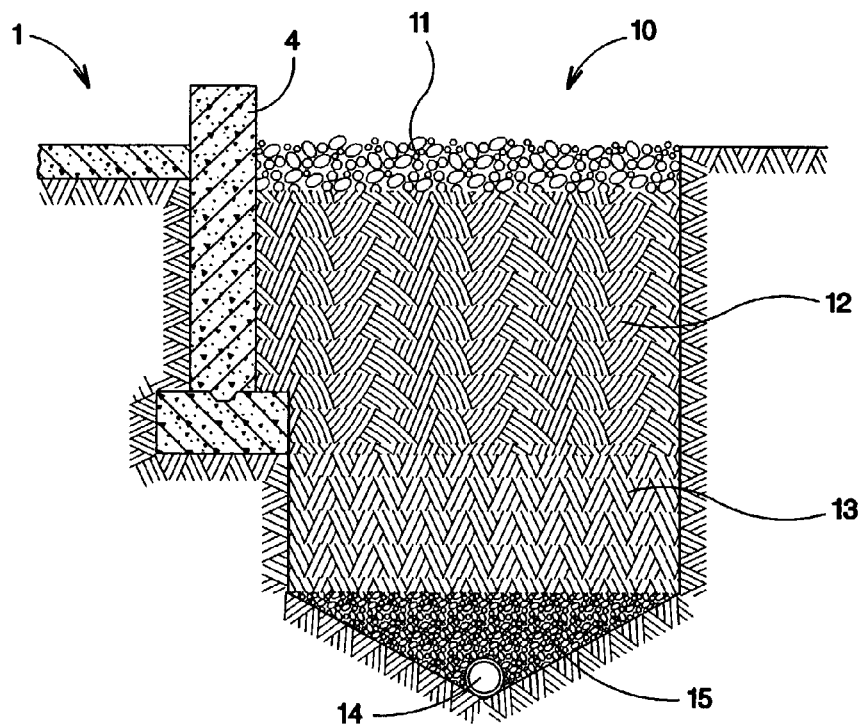
FIG. 2 is a cross-section view taken along the line 2—2 of FIG. 1.
Figure 7:
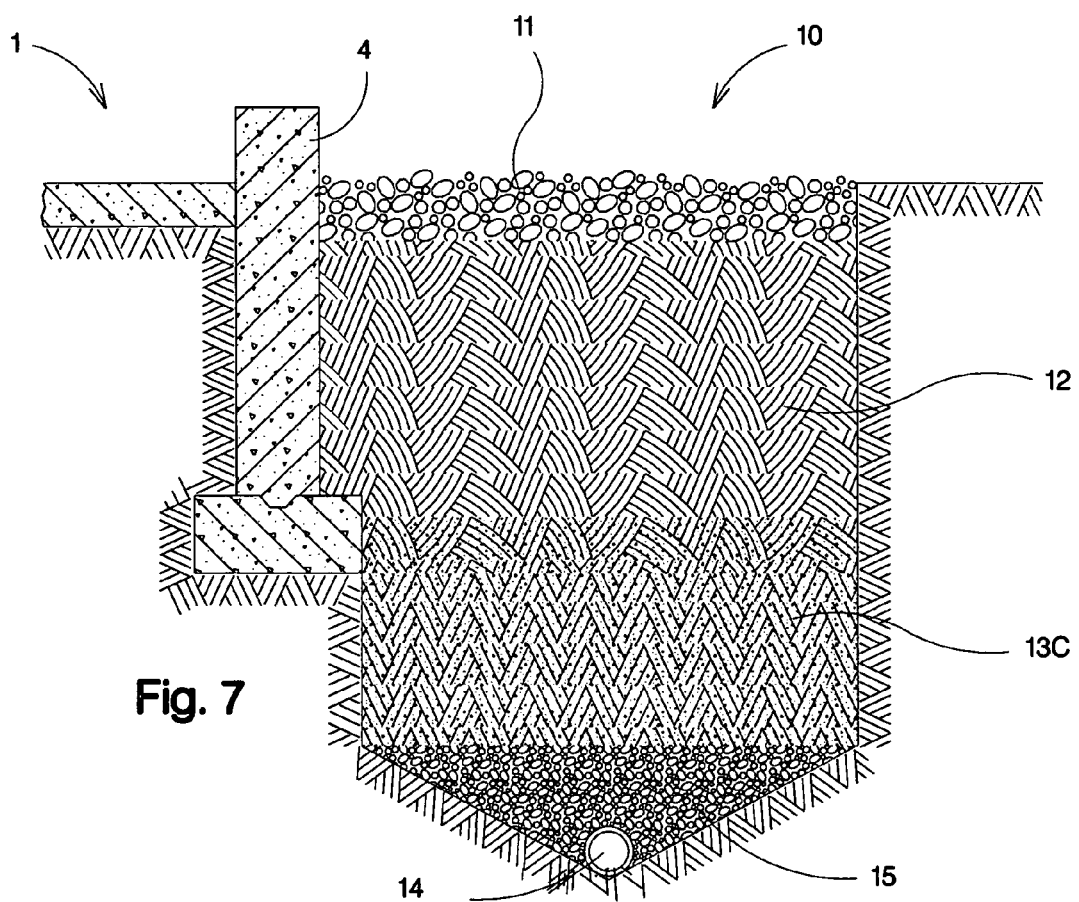
FIG. 7 is an alternate embodiment similar to FIG. 2.
Figure 8:
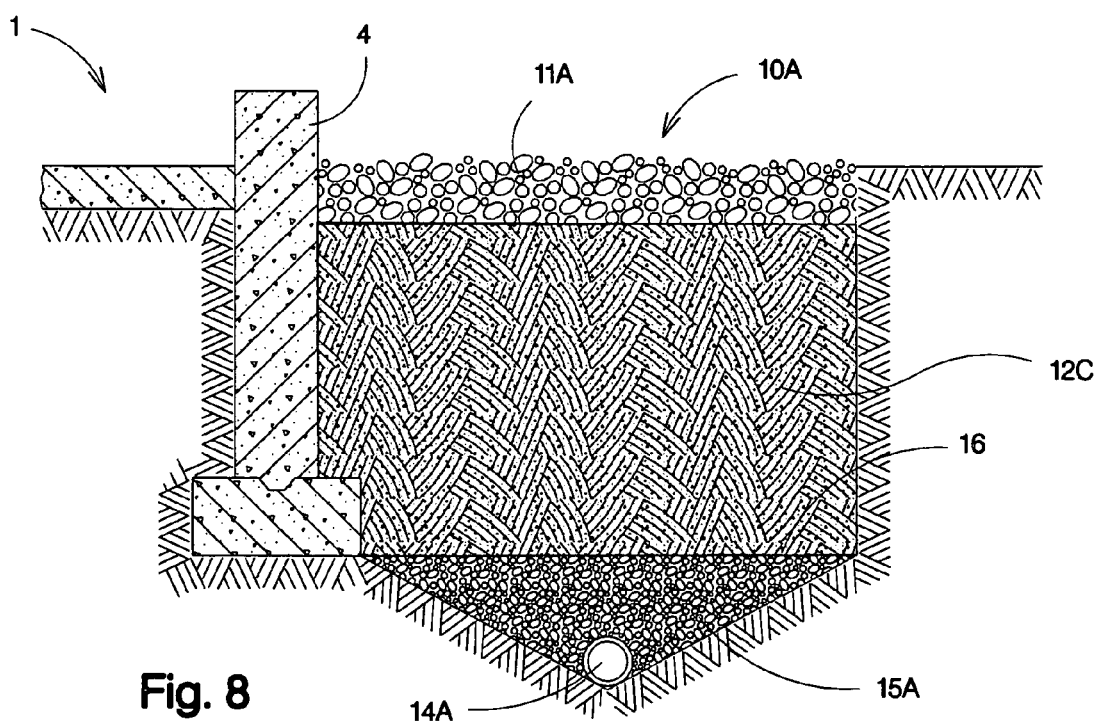
FIG. 8 is an alternate embodiment similar to FIG. 3.

Referring to FIG. 2, taken along the lines 2-2 of FIG. 1, the preferred water treatment system 10 of the present invention includes a first filter layer 11 (also shown in FIG. 1) comprising a bed of high calcium material such as crushed limestone, marble, seashells, or any other suitable, and preferably, decorative high calcium material. A second filter layer 12, comprising decaying wood materials, is positioned below the high calcium material layer 11. In the preferred embodiment, the second filter layer 12 comprises wood mulch produced from decaying materials such as wood chips, shredded tree bark, or shredded wood. The second filter layer 12 is supported on a permeable material layer 13 selected for its porosity to provide a controlled percolation flow rate of collected stormwater to a drainage layer that includes a drainpipe arrangement 14 embedded within an aggregate or gravel 15 to provide a discharge of treated stormwater to environment. Exemplary materials for use in layer 13 may include carbon compounds and/or non-carbon containing compounds such as shredded or ground plastics, plastic mesh, or grids, soils such as topsoil, sand, fine gravel, or a mixture thereof as illustrated in FIG. 7 and FIG. 8 showing such a mixture as composite filter materials 13 C and 12C respectively. The water treatment system, shown in FIGS. 1 and 2, extends along the periphery of structure 1 adjacent the structure foundation wall 4 so that the high calcium material layer 11 is placed in a position to receive stormwater discharged from the zinc coated roof panels 2, and from the zinc coated siding panels 3.

Figure 3:
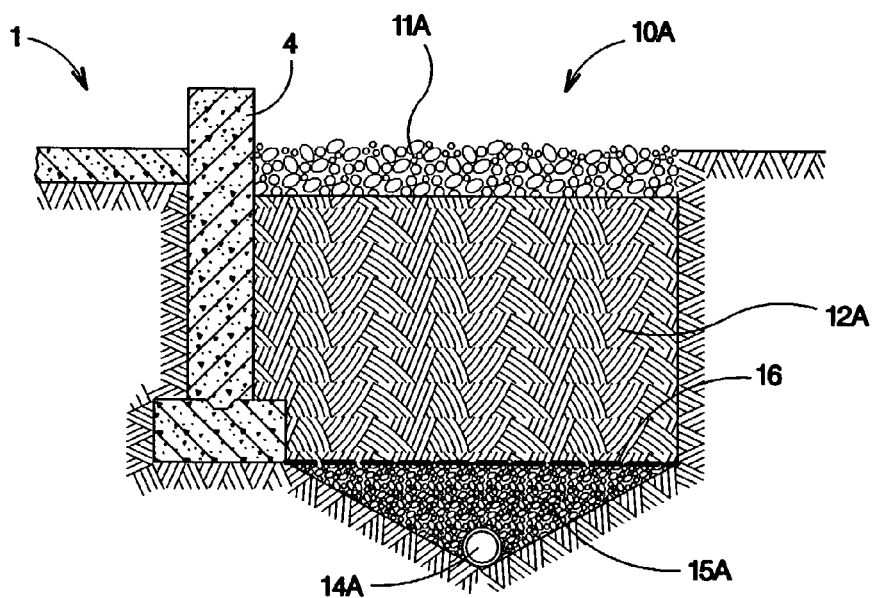
FIG. 3 is a cross-section view similar to FIG. 2 showing an alternate embodiment of the present water treatment system invention; invention.

FIG. 3 illustrates one alternate embodiment of the present water treatment system. The alternate water treatment system 10A includes a first filter layer of high calcium material 11A positioned adjacent the structure foundation wall 4 so that the high calcium material receives stormwater discharge from the zinc coated roof panels and from the zinc coated siding panels (FIG. 1). A layer of wood mulch material provides a second filter layer 12A positioned below the first filter layer 11A, and a permeable non organic barrier 16 comprising a synthetic screen, for example a geo-textile, plastic mesh, plastic screening, or other non-corrosive type grid or mesh, is positioned between the wood mulch layer 12A and the gravel bed drain arrangement 15A. The mesh, screen, or grid size and arrangement is preselected to control treated stormwater flow rate from the wood mulch layer 12A to a gravel bed 15A; and the gravel bed, drainpipe 14A arrangement provides a drainage of treated stormwater to environment.

Figure 4:
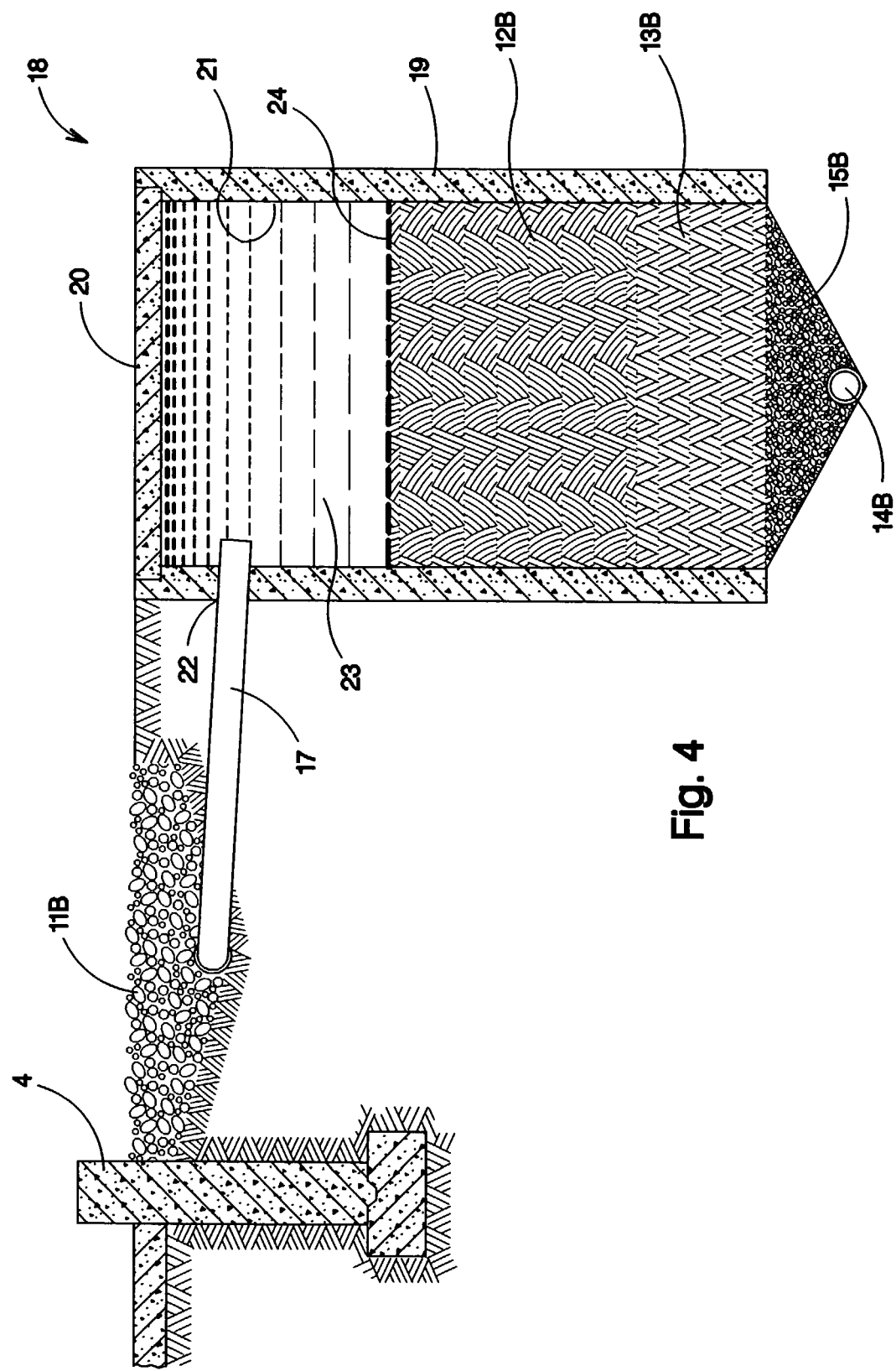
FIG. 4 is a cross-section showing another alternate embodiment of the present water treatment system invention.

FIG. 4 shows a second alternate embodiment of the present water treatment invention. The second alternate water treatment system 10B includes a first filter layer of high calcium material 11B positioned adjacent the structure foundation wall 4 so that the high calcium material receives stormwater discharge from the zinc coated roof panels and from the zinc coated siding panels (FIG. 1). A drainpipe 17, embedded within the high calcium material 11B, provides a discharge of collected stormwater runoff from the first filter layer to a treatment device 18 located remote from structure 1. The treatment container may be a subsurface structure as shown in FIG. 4, or, it may be an above ground structure (not shown). However, it is preferred to locate treatment device 18 at an elevation below the high calcium material layer so there is no need to pump collected stormwater runoff from the high calcium material layer 11B to the treatment device 18.

The treatment container comprises a large box like or circular container 19 and a removable lid or cover 20 to provide access to the container interior 21. The remote location of container 19 simplifies replenishing and/or replacing the carbon containing filter and the other layers without disturbing the decorative high calcium material and other landscaping adjacent structure 1. Additionally, the container lid 20, in the second alternate embodiment, is located at grade so there is no need to excavate when it becomes necessary to replenish or replace filter or drain materials.

Drainpipe 17 extends through an aperture 22 provided in the container wall, and the drainpipe communicates with the container interior so that stormwater runoff 23, collected in the high calcium material layer 11B, is discharged into treatment device 18. The collected stormwater runoff 23 trickles downward through a multi-layered filter arrangement comprising a layer of wood mulch filter material 12B and a layer of permeable material 13B, that is preselected for its porosity to provide a desired percolation flow rate to the drainage comprising a gravel bed 15B and drainpipe arrangement 14B that discharges treated effluent to environment. A heavy grate or a layer of crushed stone or the like 24 may be placed on top of the wood mulch layer 12B to prevent the wood mulch from floating upward into the collected stormwater 23.

Referring again to FIGS. 1-3, the high calcium material layer 11, 11A over the top of the decaying wood mulch layer 12, 12A provides several advantages not found in the prior art. First, the high calcium material neutralizes acidic stormwater runoff and increases the calcium carbonate hardness in the treated water. Both actions lessen toxicity of dissolved metals contained in the treated waters. The high calcium material 11, 11A also prevents the sun from drying out the underlying wood mulch material, and the layer of high calcium stone or the like helps to prevent germination of seeds that would accelerate the rate of decay in the wood mulch layer 12, 12A. Accelerated decay rates result in a need for more frequent replacement of the wood mulch layer.

Figure 5:
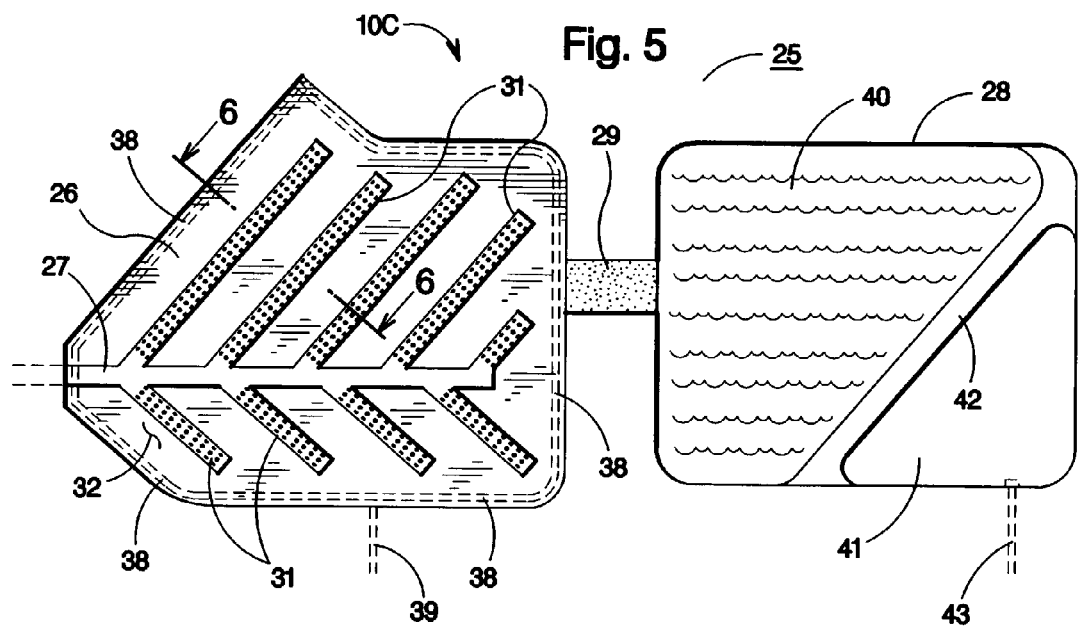
FIG. 5 is a plan view of a detention pond arrangement for treating stormwater run discharged from zinc coated or Galvalume coated surfaces.
Figure 6:
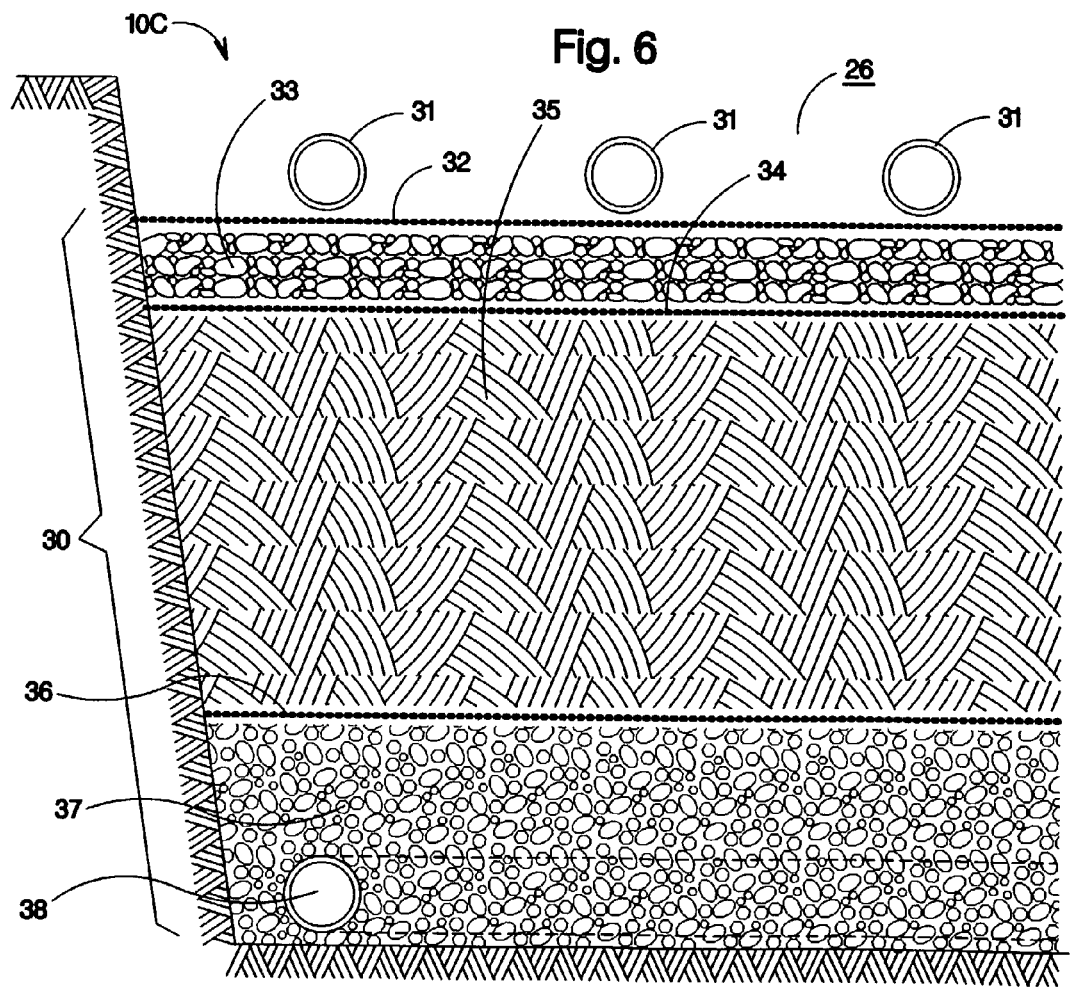
FIG. 6 is a cross-section view taken along the lines 6-6 of FIG. 5.

FIGS. 5 and 6 show still another alternate embodiment of the present water treatment invention 10C to remove and/or detoxify dissolved metals contained in stormwater runoff. This embodiment is more suited to treatment of runoff from very large surfaces, and it comprise a detention pond arrangement 25 having a primary treatment pond 26 that receives a stormwater discharge through a drain pipe 27, and a secondary settlement pond 28 that receives a stormwater overflow via weir 29 extending between the primary treatment pond 26 and secondary settlement pond 28. Such stormwater overflows only occur during intense downpours, and it should be noted that during such heavy rainfalls, leaching of zinc from Galvalume roofing is less a problem than when the precipitation is in the form of a slow drizzle or mist. There are two reasons for this. First, heavy rain downpours are discharged from roof surface at a rate that is too quick for substantial metal leaching to take place. Second, the pH of very heavy rainfalls is often too high to leach metals from roof surfaces; that is, there is not enough acid in the atmosphere to acidify a large volume of rainfall. Such heavy rain downfall discharge will comply with EPA regulations for dissolved zinc levels, and the resulting overflow to settlement pond 28 may be discharged directly to environment without treatment.

Referring in particular to FIG. 6, the primary treatment pond, or treatment cell 26, includes a columnar arrangement 30 comprising plurality of different filtrate filter layers that receive an inflow of discharged stormwater from drain pipe 27 (FIG. 5) and laterals 31 that evenly distribute the inflow waters across the surface of the treatment cell 26. In the present water treatment embodiment 10C, the top filter layer is a geotextile material 32 that provides a permeable layer to control percolation rate of the distributed stormwater inflow seeping into a second filter layer 33 of high calcium material. The second filter layer of a selected high calcium material 33 neutralizes acidity and precipitates certain metals that may be dissolved in the stormwater runoff. A third filter layer 34, also comprising a geotextile material or the like to control percolation rate, is positioned between the high calcium material layer 33 and a layer of wood mulch 35 comprising a decomposing material as described in the earlier embodiments. The wood mulch filter layer is supported on a fifth filter layer that is selected from a material comprising either a carbon compound substance or a noncarbon compound substance, so that the selected material provides a desired treated stormwater flow rate from the wood mulch or fourth filter layer to the final or sixth filter layer comprising a gravel bed 37 and drain arrangement 38 having at least one discharge drain 39 to environment. As mentioned above, the fifth filter layer 37 may be any suitable filter material that provides a desired percolation rate to the sixth filter layer gravel bed 37, the material comprising shredded or ground plastics, plastic mesh, or grids, soils such as topsoil and clay, sand, fine gravel, compost materials, or a mixture thereof.

The secondary settlement pond 28, shown in FIG. 5, includes a deep end 40 and shallow end 41 separated by a barrier for example a dike or elevated earthwork 42 to isolate the shallow end from the deeper end. In this way, deep end 40 is able to receive all or most overflow waters discharged from treatment cell 26, and the overflow stormwater contained in end 40 is allowed to percolate into the water table. In extreme instances, where rainfall overflow fills deep end 40, incoming stormwater is able to flow over flow over earthwork 42, and if necessary, the excess water is discharged to environment through at least one drain 43 placed in shallow end 41 at about 1-foot below the brim of the secondary settlement pond 28.

Even though prior art teaches percolating acidic, metal-bearing waters through limestone at controlled flow rates to neutralize acidity and to precipitate metals, limestone doesn't raise the pH of the acid rainwater to a high enough level for effectively removing particular heavy metals such as zinc. Therefore, the use of limestone alone in a stormwater treatment system will not meet environmental regulatory standards for zinc concentration levels in stormwater discharged from Galvalume® type surfaces.

However, it has been discovered that by providing an underlying layer of wood mulch as a carbon compound filter material 12, 12A, 12B, the wood mulch provides an excellent site for growth of certain anaerobic bacteria that reduce sulfate ions contained in collected stormwater. The reduction of sulfate ions produces free oxygen in the stormwater that is taken up by bacteria, and sulfide ions that precipitate the soluble metals contained in the stormwater, for example, the sulfide ions precipitate dissolved zinc as zinc sulfide. The zinc sulfide precipitate will remain in the wood mulch layer 12, 12A, 12B with any escaping zinc sulfide being trapped within the underlying permeable layer 13, 13A, 13B. Most metal sulfide precipitates are inert and insoluble in water. Therefore, subsequent leaching by additional contact with acidic rainfall will not dissolve the metal sulfides back into a toxic solution. The use of wood mulch as a filter is quite different when compared to the prior art teaching where, for example, Stormwater Management uses leaf mulch as a carbon compound filter material. Our preferred embodiment uses wood mulch as a carbon compound filter material because it has been discovered that such a wood mulch filter will reduce zinc concentration levels to or below zinc levels permitted by environmental regulations. Additionally, as shown in the following Examples A and B, it has also been discovered that a wood mulch filter is an improvement over a leaf mulch filter in that wood mulch reduces zinc concentration to a lower level as compared to a leaf mulch filter. Additionally, it has been found that wood mulch decays more slowly than leaf mulch, and therefore, wood mulch provides longer service life before replenishment is required. Furthermore, in addition to precipitating soluble metals contained in the stormwater runoff, decaying wood mulch also increases the dissolved carbon content in the runoff discharged to environment and thereby reduces toxicity of any remaining soluble metals that may remain in the discharged water.

EXAMPLE A

A pilot plant utilizing a high calcium limestone stormwater collection layer and leaf mulch filter layer was constructed to receive and filter simulated rainfall runoff. The test apparatus comprised a 4-foot wide by 4-foot long by 4-feet deep reinforced plywood box like container lined with plastic sheeting. Drainpipes were placed in the bottom of the container and covered with ⅜-inch diameter gravel, and about an 18-inch layer of topsoil to provide a permeable layer for controlling percolation flow rate to the gravel drain arrangement. Approximately 16-inches of leaf mulch covering was placed over the topsoil layer and topped with a 4 to 5-inch layer of high calcium limestone crushed and screened to a minus six mesh. A pump and coarse spray nozzle arrangement were used to deliver laboratory prepared rainwater runoff from a supply tank, the simulated rainwater runoff having a zinc concentration level of 1.0 mg/liter and a pH 4.4 to agree with laboratory analysis of actual stormwater discharged from Galvalume® roofing. A series of tests were conducted during a period beginning Jun. 13, 2000 and ending Aug. 7, 2001 to determine a suitable system and method for reducing zinc concentration levels in treated stormwater discharged to environment. The site-specific, state water quality criterion for zinc concentration levels is 0.035 mg/liter. A first series of 37-tests were conducted to collect data to determine the effectiveness of a limestone/leaf-mulch water treatment system. The results from the tests were compared to a site-specific, New Hampshire state water quality discharge criterion for zinc of 0.035 mg/liter. The collected data for the 37-leaf mulch tests show a stormwater inflow with an average zinc concentration of 1.023 mg/liter and an average pH 4.3, and a treated stormwater outflow with an average zinc concentration level of 0.016 mg/liter and an average pH 5.8. The raw data for the 37-leaf mulch tests show a zinc outflow concentration level ranging between 0.005 to 0.100 mg/liter with about 21.6% of the outflow discharge failing to meet the New Hampshire state site-specific water quality criterion of 0.035 mg/liter for zinc.

EXAMPLE B

A similar series of 28-water treatment tests were conducted for a limestone/wood-mulch system during a period beginning Aug. 20, 2001 and ending May 28, 2002. The tests were conducted using the same test apparatus described for Example A with the leaf mulch being replaced with wood mulch. The data collected during the 28-tests show a stormwater inflow with an average zinc concentration of 1.077 ppm with an average pH 4.3, and a treated stormwater outflow with an average zinc concentration level of 0.007 ppm with an average pH 6.2. The raw data collected for the limestone/wood-mulch tests show a zinc outflow concentration level ranging between 0.005 to 0.023 mg/liter with every outflow discharge meeting the New Hampshire state site-specific water quality criterion of 0.035 mg/liter for zinc.

The test data collected for Examples A and B clearly show improvement in zinc concentration level reductions for a water treatment system using high calcium material in combination with wood mulch as compared to a water treatment system using the same high calcium material and leaf mulch. The data also shows that a high calcium and wood mulch water treatment system is more effective in raising the pH level of acid rain runoff as compared to a limestone and leaf mulch water treatment system.

It should be understood that while this invention has been described as having a preferred embodiment, it is capable of further modifications, uses, and/or adaptations of the invention, following the general principle of the invention and including such departures from the present disclosure as have come within known or customary practice in the art to which the invention pertains, and as may be applied to the central features hereinbefore set forth, and fall within the scope of the invention of the limits of the appended claims. For example, while the detailed description teaches a water treatment system having a second filter layer of wood mulch material in combination with a third filter layer of permeable material comprising any suitable permeable material that delivers a desired percolation flow rate of treated water to the drainage system, an alternate embodiment may comprise combining the wood mulch layer and permeable layer into a single second filter layer in preselected proportions that deliver the desired percolation flow rate of treated water to the drainage system. Additionally, all though the preferred embodiment shows the removal and/or detoxication of dissolved zinc in a stormwater discharge, the present invention may be used to remove and/or detoxify any dissolved metal in a water source or water discharge without departing from the scope of this invention. For example, the present water treatment system is capable of removing any dissolved aluminum leached from a Galvalume roof Additionally, the present invention is well suited for the treatment of acid mine waters, municipal stormwater discharges, and any other water source that contains concentrations of dissolved metals and/or low pH levels.

We claim:

1. An apparatus for reducing toxicity of zinc containing stormwater runoff comprising:
   a) a first filter layer comprising a high calcium material;
   b) a last filter layer comprising an aggregate and an effluent drain arrangement; and
   c) at least one intermediate filter layer positioned between said first filter layer and said last filter layer, said one intermediate filter layer comprising wood mulch.

2. The invention recited in claim 1, comprising:
   a) an additional filter layer positioned between said at least one filter layer and said last filter layer, said additional filter layer having a selected porosity to control stormwater flow rate to said last filter layer.

3. The invention recited in claim 2 wherein said material having a selected porosity is an organic material.

4. The invention recited in claim 3 wherein said organic material is topsoil.

5. The invention recited in claim 2 wherein said material having a selected porosity is a synthetic material.

6. The invention recited in claim 5 wherein said synthetic material is a plastic mesh.

7. The invention recited in claim 5 wherein said synthetic material is a geotextile material.

8. The invention recited in claim 1 wherein said at least one filter layer is selected from a group of decaying materials comprising, wood chips, tree bark, or shredded wood.

9. The invention recited in claim 1 wherein said at least one filter layer is a composite filter material comprising:
   a) wood mulch; and
   b) a material having a selected porosity to control stormwater flow rate to said last filter layer.

10. The invention recited in claim 9 wherein said material having a selected porosity is a carbon compound material.

11. The invention recited in claim 10 wherein said material having a selected porosity is topsoil.

12. A water treatment system to reduce toxicity in zinc containing acidic stormwater runoff from zinc coated roof panels covering a structure, comprising:
   a) a bed of high calcium material extending along a periphery portion of the structure and positioned to receive stormwater runoff discharged from the zinc coated roof panels;
   b) a carbon compound filter positioned below said bed of high calcium material to receive stormwater runoff percolated through said bed of high calcium material; and
   c) a drain arrangement positioned below said carbon compound filter to receive and discharge to environment treated stormwater runoff percolated through said carbon compound filter.

13. The invention recited in claim 12 wherein:
a) said carbon compound filter is positioned remote from said bed of high calcium material; and
b) at least one conduit delivers percolated stormwater from said bed of high calcium material to said carbon compound filter.

14. The invention recited in claim 12 wherein said carbon compound filter is wood mulch.

15. The invention recited in claim 14 wherein said wood mulch is derived from a group of selected materials comprising, wood chips, tree bark, or shredded wood.

16. The invention recited in claim 12 comprising; an additional filter material positioned between said carbon compound filter and said drain arrangement, said additional filter material having a selected porosity to control stormwater flow rate to said drain arrangement.

17. The invention recited in claim 16 wherein additional filter material is an organic compound.

18. The invention recited in claim 17 wherein said organic compound is topsoil.

19. The invention recited in claim 16 wherein additional filter material is a synthetic.

20. The invention recited in claim 19 wherein said synthetic is a plastic mesh.

21. The invention recited in claim 19 wherein said synthetic is a geotextile material.

22. The invention recited in claim 12 wherein said carbon compound filter is a composite material including at least one material having a selected porosity that delivers a desired flow rate of treated stormwater runoff to said drain arrangement.

23. The invention recited in claim 22 wherein said composite material comprises:
a) wood mulch is derived from a group of selected materials comprising, wood chips, tree bark, or shredded wood; and
b) said material having a selected porosity is selected from a group of materials comprising topsoil, sand, fine gravels, compost materials, or a mixture thereof.

24. A treatment cell for removing dissolved zinc contained in rainwater discharged from a zinc coated metal surface, comprising: a columnar arrangement including a plurality of different filter layers, said columnar arrangement including:
a) at least one filter layer comprising a wood mulch filter material,
b) at least one filter layer comprising a drain bed and discharge to environment, said drain bed positioned in said columnar arrangement at a location below said at least one wood mulch filter layer, and
c) a plurality of flow rate control filter layers that are spaced apart within said columnar arrangement to control rainwater percolation from a surface of said treatment cell to said drain bed.

25. The invention in claim 24 wherein said treatment cell is a first detention pond adapted to receive the rainwater in an arrangement of cooperating detention ponds.

26. The invention of claim 24 further comprising:
a) at least one filter layer including a high calcium material positioned within said first columnar arrangement at a location above said at least one wood mulch filter layer.

* * * * *